July 20, 1943.  J. S. MERCHANT  2,324,863
BEARING
Filed Dec. 13, 1941
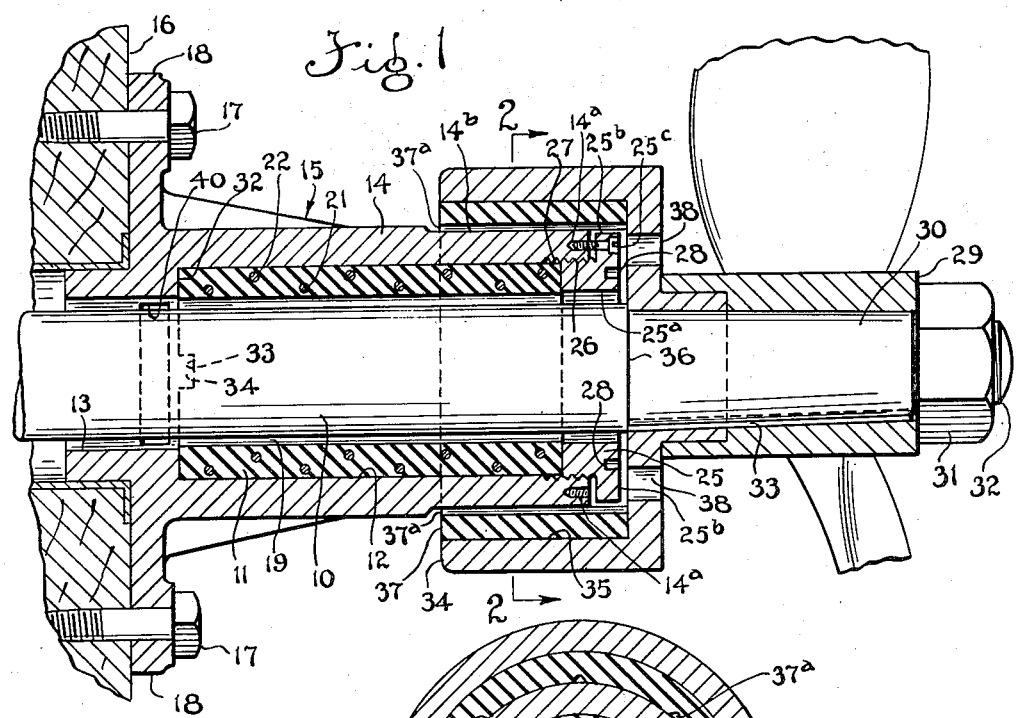
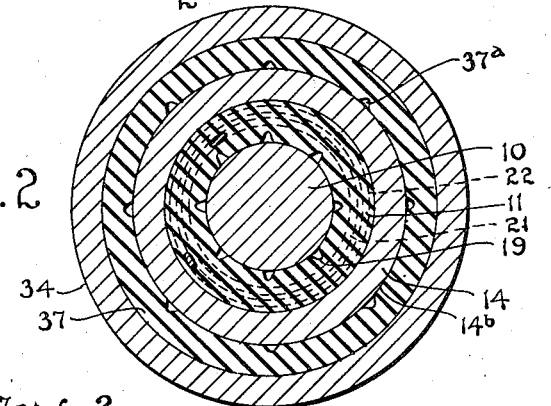
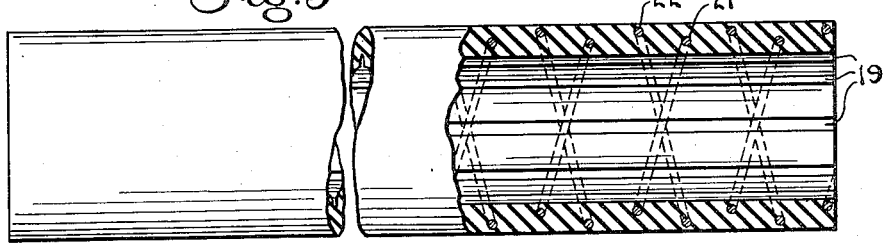
INVENTOR.
John S. Merchant
BY Ralph Barrow
ATTY.

Patented July 20, 1943

2,324,863

UNITED STATES PATENT OFFICE 2,324,863

BEARING

John S. Merchant, Cuyahoga Falls, Ohio

Application December 13, 1941, Serial No. 422,821

6 Claims. (Cl. 308—238)

This invention relates to bearing structures, and in particular relates to marine or like bearing structures in which a shaft or other part is relatively rotatable in a water-lubricated cylindrical rubber bearing.

Heretofore, bearing structures for marine propeller shafts, for example, have usually comprised a housing secured to the stern post of a vessel, this housing having a water-lubricated rubber bearing removably and replaceably retained therein for rotatably receiving a propeller shaft. One difficulty encountered with this type of structure has been that when the rubber of the propeller shaft was subjected to excessive torsional strain at the outer end thereof, between the propeller and the bearing, particularly upon the rubber bearing surface becoming worn, the shaft tended to whip or lash, whereby excessive vibration was transmitted through the shaft to other parts of the vessel.

Furthermore, in the past, water-lubricated rubber bearings have usually comprised a rubber or like sleeve vulcanized or otherwise bonded to a metal reinforcing or backing sleeve. Such bearings were relatively expensive to manufacture due to the fact that both the metal and the rubber sleeve required machining and other special treatment for satisfactorily bonding the rubber to the metal. Additional machining on both the inner and outer peripheries of the finished bearing was frequently necessary for fitting the same to a specific housing and shaft. Also, no adjustment could be made for wear on the rubber bearing sleeve, and hence it was necessary to replace the bearing whenever such wear caused substantial vibration. Another serious difficulty arose from the fact that the adhesion or bond between the rubber and metal sleeves of the bearing frequently became broken, thereby resulting in extensive damage to the bearing structure and associated parts.

An object of this invention is to provide an improved marine or like bearing structure in which a shaft is relatively rotatable in a water-lubricated rubber bearing mounted in a bearing housing, and including auxiliary water-lubricated rubber bearing means for preventing or minimizing vibration due to excessive torsional strain between the shaft and the first-named bearing.

Another object of the invention is to provide a water-lubricated rubber bearing which is simple and economical to manufacture, particularly because of the elimination of the usual metal reinforcing or backing sleeve which thereby obviates machining to produce such backing sleeve, and because the improved bearing requires a minimum of machining to install in a bearing structure.

Another object of the invention is to provide a rubber or like bearing which, once installed in a bearing structure, may be adjusted from time to time for wear on the rubber bearing surface thereby obviating the usual necessity of replacing the bearing before a substantial thickness of rubber is worn away.

Another object of the invention is to provide a rubber bearing for the purposes described, having longitudinally yieldable reinforcing means embedded therein which resists torsional strain applied thereto substantially uniformly in either direction.

These and other objects of the invention will be manifest from the following brief description and the accompanying drawing.

Of the accompanying drawing:

Figure 1 is a longitudinal cross-section, partly broken away, through a bearing structure embodying the features of the invention for use with marine propeller shaft.

Figure 2 is a cross-section taken on the line 2—2 of Figure 1.

Figure 3 is a view, partly broken away and in section of a length rubber bearing adapted to be cut into shorter lengths for use in bearing structures, and illustrating the manner of reinforcing the same.

Referring to the drawing, the numeral 10 designates a marine propeller shaft journalled in a cylindrical bearing 11 of rubber or like resilient material and of improved construction as will be described in detail later, this bearing being removably retained in a bore 12 constituting an enlargement of a central shaft-receiving aperture 13 in a sleeve-like portion 14 of a bearing housing 15. The housing 15, for illustrative purposes, is shown secured to a wooden stern post 16 of a vessel, as by means of screws 17 extending through flanges 18, 18 on the housing into the stern post.

The improved bearing 11 may comprise a continuous sleeve formed of vulcanized rubber or like resilient or elastic material, of sufficient wall thickness to give desired stiffness for supporting the shaft 12, circumferentially spaced grooves 19, 19 being provided on the inner periphery to define a plurality of longitudinal flutes 20, 20 providing relatively wide shaft bearing surfaces. The grooves 19 permit passage of water through the bearing for lubricating the same, as will be described later. Other known arrangements of bearing surface grooving or scoring for water-lubricating purposes may be utilized, as for example as shown in Patent No. 1,416,988, issued May 23, 1922.

For reinforcing the rubber bearing 11, to give it desired resistance to torsional strains and yet permitting the same to be longitudinally yieldingly compressible, one or more coil springs 21, 22 may be embedded in the wall of the bearing, substantially as shown (see Figures 2 and 3). These springs, which preferably are of stainless steel or other material not corrosively affected by water, may be incorporated in the bearing by various known methods, as for example by fabricating layers of rubber into a length of tubing on a mandrel (not shown) having desired shape for forming the grooves 19 in the sleeve 11, coil springs 21, 22 being arranged between certain layers as desired, vulcanizing the tubing in a known manner while still on the mandrel, and removing the tubing from the mandrel and cutting it to desired shorter lengths for bearings. The tubing may also be produced in a known manner by vulcanizing in a cavity mold, with the spring or springs incorporated therein. The springs 21, 22 may be treated with adhesive cement or other bonding coat for providing a bond between the metal spring and the rubber of the bearing. Figure 3 illustrates a length of tubing, made in accordance with the invention, before it is cut into lengths for bearings 11.

The bearing 11 preferably is formed with two oppositely spiralling coil springs 21, 22 in the rubber wall thereof, the spring 21 being concentrically arranged within a spring 22 of smaller diameter (see Figure 3). The purpose of the oppositely spiralling arrangement of the coil springs is so that the yielding resistance of the bearing to any torsional stresses, as applied thereto by rotation of propeller shaft 10, will be substantially equal in either direction of rotation of said shaft. The strength and pitch of the springs, of course, may be modified to vary the yielding resistance thereof to suit conditions.

For removably retaining bearing 11 in the recess 12 of housing sleeve 14, a cap or nut 25, which is centrally apertured at 25a, may have an externally threaded portion 26 adapted to be screwed into an internally threaded portion 27 in sleeve 14 at the outer end thereof, spaced sockets 28, 28 being provided in the outer face of the cap to receive corresponding prongs of a suitable turning tool (not shown). The central aperture 25a of the cap 25, and the aperture 13 in the sleeve are of such diameters, larger than shaft 10, as to permit free passage of lubricating water through the grooves 19 of bearing 11. An annular flange 25b may be provided on cap 25 to extend opposite the outer end of sleeve 14 for a purpose to be described later.

The cap 25 may be threaded inwardly in sleeve 14 to apply pressure to the outer end of sleeve 11, thereby engaging the latter between the cap and a shoulder 32 formed at the inner end of recess 12. As vulcanized rubber is incompressible in confined space, the wall of the bearing is expanded against both the shaft 10 and inner periphery of the sleeve. Thus pressure may be applied to the bearing by the cap as desired to expand the bearing to fit tightly in said sleeve to be non-rotatable therein, and at the same time by such expansion to adjust the inside diameter of the bearing to the shaft 10 with proper turning clearance. Of course, the outer periphery of the rubber bearing 11 may be machined or ground if necessary for proper fitting of the bearing to the shaft upon expanding the wall of the bearing as described. To assure against relative rotation of bearing 11 in housing 15, the inner end of the former may have one or more recesses 33 cut in the inner edge thereof for reception of a block or projection 34 integral with the sleeve 14 at the inner end of bore 12.

For locking the cap 25 against turning relative to housing 15, which may be caused by vibration of the bearing structure or torsional strain on rubber bearing 11, a set screw 25c may be engaged through an aperture in the flange 25b of cap 25, and screwed in one of a series of threaded apertures 14a in the outer end of sleeve 14 of the housing. By this means the cap cannot accidentally become unscrewed to allow the bearing 11 to contract toward normal shape, due to its inherent resiliency, and thereby to become loose in the housing or to permit too much clearance for the shaft 11.

A propeller 29 is retained on a reduced tapered extension 30 on the outer end of shaft 10, by means of a nut 31 on a reduced threaded portion 32 on the end of extension 30, and the propeller is keyed against rotation on extension 30 by means of a key 33.

It is known that in a structure of the type described the propeller shaft 10 may be subjected to relatively great strain in the region between the propeller and the outer end of bearing 11. This strain is accentuated when the propeller is turning against a heavy load, under which circumstances the bearing 11 may wear unevenly, or the shaft may even break and cause serious delays before repairs can be made. To obviate these difficulties there may be provided a cylindrical member 34 having a bore therein of greater diameter than a reduced outer end portion 14b on sleeve 14, the member 34 being keyed on shaft extension 30 by means of the same key 33 which keys propeller 29. The member 34 is retained on the extension 30 by being engaged between the hub of the propeller and a shoulder 36 at the junction of shaft 11 and its reduced extension 30. The reduced end 14b of sleeve 14 is received within the bore 35 with a clearance between the inner end of the bore and the outer face of adjusting cap 25, so that the latter cannot be disturbed by rotation of member 34. Bonded by known methods to the inner periphery of the bore 35 may be a rubber or like sleeve 37 which rotatably receives the reduced portion 14b of sleeve 14. The bearing surface of cylindrical rubber bearing 37 is provided with spaced longitudinal grooves 37a, substantially like bearing 11, for passage of water therethrough for lubricating said bearing surface. A plurality of apertures 38 are provided in the wall of member 34 for passage of water to both bearings 11 and 37. If desired, the bearing 37 may be constructed with one or more coil springs embedded therein in the manner of bearing 11, in which case suitable adjusting means similar to the cap 25 may be provided. Under certain conditions it may be desirable to omit the auxiliary bearing 34.

In use the bearing structure, of course, is normally submerged in water. Flowing through the inlets 38 in auxiliary bearing member 34, and through inlets 40 in housing 15, the water passes into the grooves 19 and 37a of the bearings 11 and 37, respectively, to lubricate the bearing surfaces thereof. Water also reaches the grooves of bearing 37 from the unobstructed inner end thereof. When it is required to adjust the bearing 11 for wear, the propeller 29 and bearing 34 are removed from the propeller shaft and set screw 25c is removed to permit turning the cap 25 inwardly to expand the sleeve 11 against the shaft, as previously described. Should the auxiliary bearing be omitted from the bearing structure, bearing 11 could be adjusted for wear without removing the propeller, and in some circumstances this adjustment may even be made without removing the vessel from the water.

Thus has been provided an improved water-lubricated, marine or like bearing structure, which is adapted effectively to accomplish the stated objects of the invention.

Modifications of the invention may be resorted to without departing from the spirit thereof or scope of the appended claims.

What is claimed is:

1. A bearing structure for marine or like propeller shafts, comprising a housing, a bearing of rubber or like material in said housing, a propeller shaft journalled in said bearing and having a propeller thereon at an end of the shaft adjacent said housing, a member secured to said shaft intermediate said propeller and said housing, said housing and said member having cylindrical cooperating walls in radially spaced relation, a bearing of rubber or like resilient material mounted between said cooperating walls, and means for supplying lubricating liquid to said bearings.

2. A bearing structure comprising a relatively fixed member, a bearing of rubber or like resilient material in said fixed member, a member relatively rotatable in said bearing, adjustable means for applying pressure between the ends of said bearing yieldingly to expand the wall thereof against said fixed and said rotatable members, said fixed member having a cylindrical bearing surface radially outwardly of said bearing, auxiliary bearing means carried by said rotatable member and having a cylindrical wall in radially outwardly spaced relation to said cylindrical bearing surface on said fixed member, a bearing of rubber or like resilient material between said cylindrical wall and said cylindrical bearing surface, and means for supplying liquid lubrication to the bearing surfaces of both said bearings.

3. A bearing comprising a continuous sleeve of rubber or like resilient material, said sleeve having a pair of coil springs embedded concentrically in the wall thereof and one within the other, said springs spirally in opposite directions, said spring being yieldable longitudinally of the sleeve with the inherent resiliency of said material thereof.

4. A bearing comprising a sleeve of rubber of like resilient material, said sleeve having a coil spring spiralling around the wall thereof, and the rubber of said sleeve being bonded to said spring, said coil spring being yieldable longitudinally of said sleeve with the inherent resiliency of said material thereof.

5. A fluid-lubricated bearing structure comprising a housing having a cylindrical bore and a shoulder portion at one end of the bore, a cylindrical bearing sleeve of rubber or like elastic or resilient material received in said bore, said sleeve having a longitudinally yieldable reinforcement secured thereto, a cylindrical element relatively rotatably received through said sleeve, a cap longitudinally adjustably mounted on said housing at the other end of said bore, said cap having a portion engageable with the adjacent end of the sleeve and being longitudinally adjustable to apply pressure to the sleeve against the inherent resiliency thereof between the cap and said shoulder to expand the wall of the sleeve against said housing and said rotatable element, and means for preventing rotation of said sleeve relative to said housing, said sleeve having grooving on the bearing surface thereof for passage of lubricating fluid from one end of the sleeve to the other, said cap and said housing being apertured for entry and exit of the lubricating fluid through the grooving of said sleeve.

6. A fluid-lubricated bearing structure comprising a housing having a cylindrical bore and a shoulder portion at one end of the bore, a cylindrical bearing sleeve of rubber or like elastic or resilient material received in said bore, said sleeve having a longitudinally yieldable reinforcement secured thereto, a cylindrical element relatively rotatably received through said sleeve, a cap longitudinally adjustably mounted on said housing at the other end of said bore, said cap having a portion engageable with the adjacent end of the sleeve and being longitudinally adjustable to apply pressure to the sleeve against the inherent resiliency thereof between the cap and said shoulder to expand the wall of the sleeve against said housing and said rotatable element, and means for locking said cap against longitudinal adjustment on said housing, said sleeve having grooving on the bearing surface thereof for passage of lubricating fluid from one end of the sleeve to the other, said cap and said housing being apertured for entry and exit of the lubricating fluid through the grooving of said sleeve.

JOHN S. MERCHANT.